(12) United States Patent
Lin

(10) Patent No.: US 8,567,429 B2
(45) Date of Patent: Oct. 29, 2013

(54) FAUCET WITH A REPLACEABLE CONTROL VALVE

(76) Inventor: Wen-Tsung Lin, Fangyuan Township (TW)

( * ) Notice: Subject to any disclaimer, the term of this patent is extended or adjusted under 35 U.S.C. 154(b) by 471 days.

(21) Appl. No.: 12/873,316

(22) Filed: Aug. 31, 2010

(65) Prior Publication Data

US 2012/0048394 A1    Mar. 1, 2012

(51) Int. Cl.
*F16K 51/00* (2006.01)
(52) U.S. Cl.
USPC ................................... 137/315.11

(58) Field of Classification Search
USPC ................. 137/315.11, 625, 4, 625.41, 801
See application file for complete search history.

(56) References Cited

U.S. PATENT DOCUMENTS 4,971,113 A * 11/1990 Pawelzik et al. .......... 137/625.4
5,655,566 A *  8/1997 Tres Casas ................ 137/625.4

* cited by examiner

*Primary Examiner* — Kevin Lee

(57) ABSTRACT

A faucet capable of accepting different types of control valves includes an adapter disk, whereby a precise ceramic control valve can be mounted to the faucet. When the faucet is used alone without the adapter disk, a safety control valve can be mounted in the faucet. In this way, the faucet can accept two different kinds of control valves, thereby increasing the functionality thereof.

5 Claims, 8 Drawing Sheets

FAUCET WITH A REPLACEABLE CONTROL VALVE

BACKGROUND OF THE INVENTION

1. Field of the Invention

The present invention relates to a faucet with replaceable control valves, and in particular to a faucet in which a precise ceramic control valve or a safety control valve can be mounted.

2. Description of Prior Art

Faucets available in the market are configured to allow cold water and hot water to flow through them, thereby providing water of different temperatures depending on the mixing ratio between the cold water and the hot water. Usually, the faucet is used to provide cold water or warm water. In a few cases, people may directly use the hot water supplied by the faucet. The warm water is obtained by mixing cold water and hot water in a desired ratio. The most common way of controlling the mixing ratio between cold water and hot water is achieved by a precise ceramic control valve or a safety control valve. However, since the constructions of these two control valves and their water-controlling mechanisms are different from each other, the precise ceramic control valve is incompatible with the safety control valve, so that they cannot be substituted for each other in the same faucet. As a result, the manufacturers in this field need to produce different kinds of faucets separately to meet the standards of the precise ceramic control valve and the safety control valve, which increases the cost of developing and manufacturing the faucets. Further, the faucets with different kinds of control valves have to be respectively stocked, which increases the amount of required storage space.

Thus, if there is a faucet capable of replacing control valves in which a precise ceramic control valve or a safety control valve can be compatibly used, then only a single construction of the faucet can support two different kinds of control valves, thereby increasing the functionality thereof.

In view of the above-mentioned problems, the present inventor proposes an improved faucet based on his research and expert knowledge.

SUMMARY OF THE INVENTION

The primary object of the present invention is to provide a faucet capable of replacing control valves. The faucet has an adapter disk, whereby a precise ceramic control valve can be mounted to the faucet. When the faucet is used alone without the adapter disk, a safety control valve can be mounted in the faucet. In this way, the faucet of the present invention can support two different kinds of control valves, thereby increasing the functionality thereof.

According to an embodiment the present invention, the faucet has a base. A valve chamber is formed in the base and the bottom of the base is in communication with a cold water inlet pipe, a hot water inlet pipe and an outlet pipe. The inner bottom surface of the valve chamber is formed with two spaced positioning recesses. One side of the two positioning recesses is provided with a concave mixing trough. The two positioning recesses and the mixing trough are in communication with a cold water inlet port, a hot water inlet port and an outlet port respectively. The cold water inlet port, the hot water inlet port and the outlet port are in communication with the cold water inlet pipe, the hot water inlet pipe and the outlet pipe respectively. The bottom of the adapter disk has two extension legs corresponding to the positioning recesses of the faucet. The interiors of the two extension legs are formed with a cold water through-hole and a hot water through-hole respectively in communication with the top surface of the adapter disk. The front surface of the adapter disk is provided with an outlet through-hole, and two locking holes are formed on the same surface as the outlet through-hole diagonally with respect to the extension legs respectively. The peripheries of the adapter disk and the extension legs are provided with a respective sealing ring. The periphery of the front surface of the adapter disk is formed with an upwardly-extending flange. With the above construction, an embodiment faucet capable of replacing control valves can be formed.

DETAILED DESCRIPTION OF THE INVENTION

Figure 1:
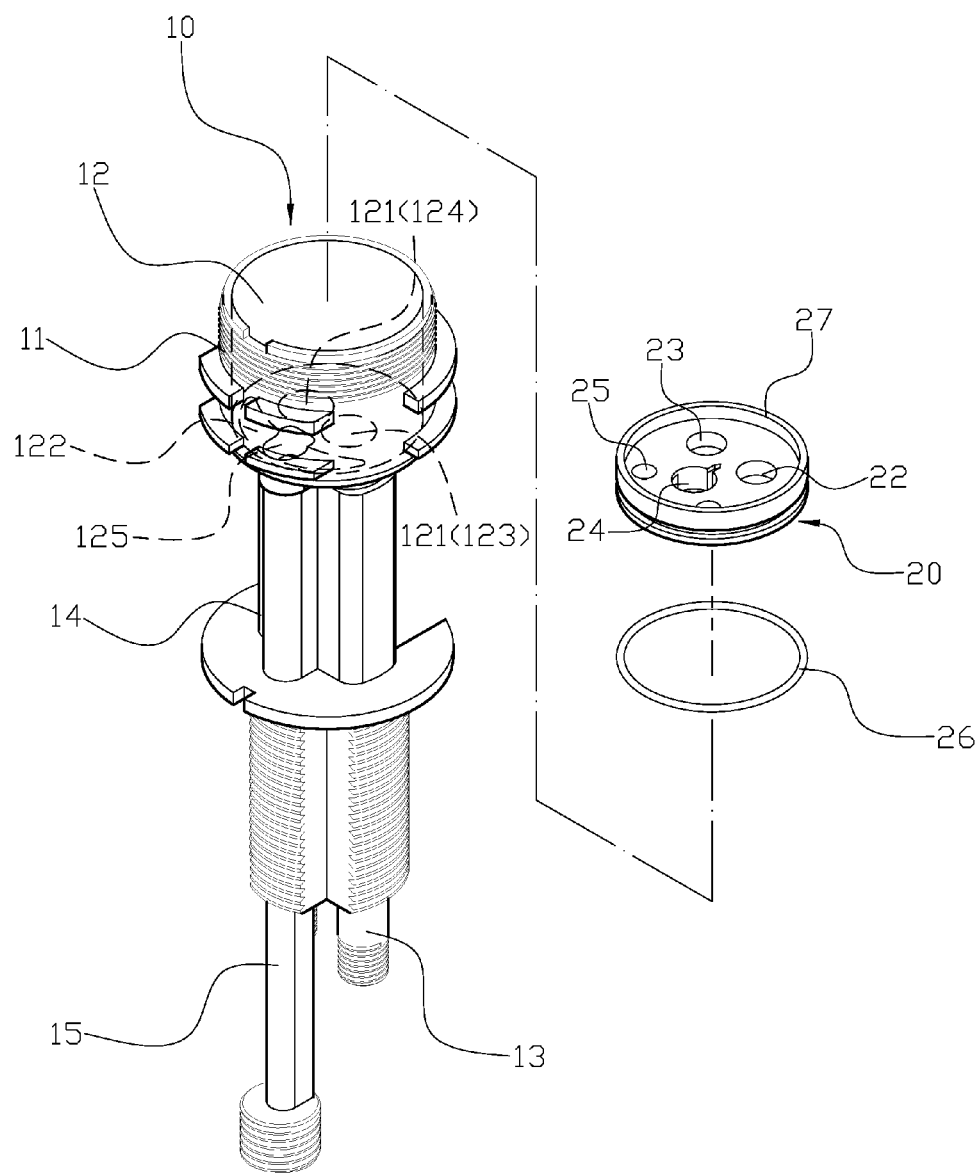
FIG. 1 is an exploded perspective view of the present invention.
Figure 2:
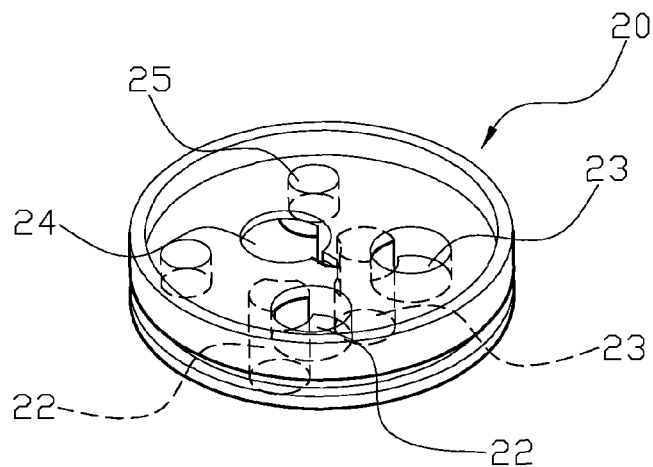
FIG. 2 is a perspective view showing the external appearance of an embodiment adapter disk.
Figure 3:
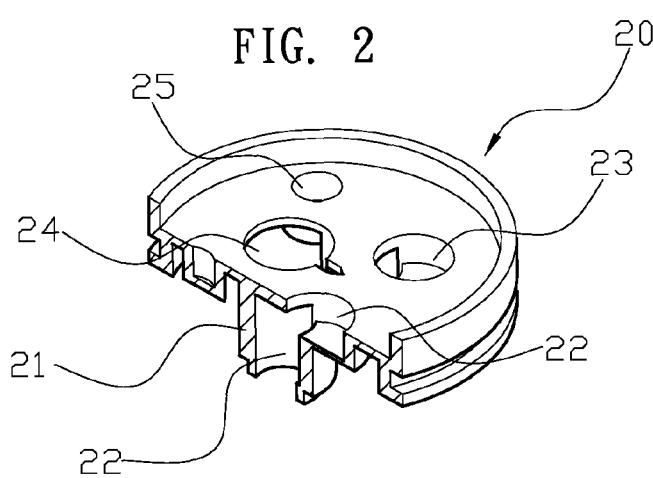
FIG. 3 is a partial cross-sectional view showing an embodiment adapter disk.
Figure 4:
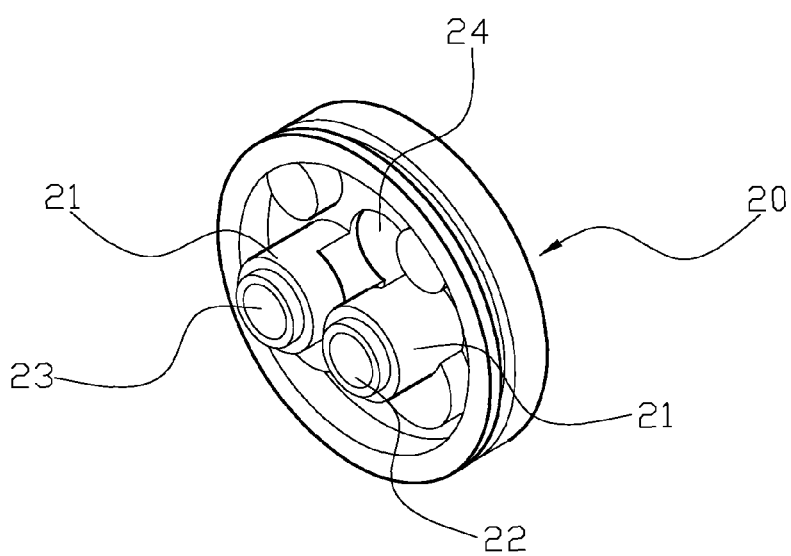
FIG. 4 is a perspective view showing an embodiment adapter disk taken from another viewing angle.

Please refer to FIGS. 1, 2, 3, 4, 5, and 8. A faucet 10 of the present invention has an adapter disk 20, whereby a precise ceramic control valve 30 can be mounted to the faucet 10. When the faucet 10 is used alone, a safety control valve 40 can be mounted to the faucet 10 in a replaceable manner, so that only one faucet 10 needs to be used for two different kinds of control valves. The faucet 10 has a base 11. A valve chamber 12 is formed in the base 11. The bottom of the base 11 is in communication with a cold water inlet pipe 13, a hot water inlet pipe 14 and an outlet pipe 15. The inner bottom surface of the valve chamber 12 is formed with two spaced positioning recesses 121. One side of the two positioning recesses 121 is provided with a concave mixing trough 122. The two positioning recesses 121 and the mixing trough 122 are in communication with a cold water inlet port 123, a hot water inlet port 124 and an outlet port 125 respectively. The cold water inlet port 123, the hot water inlet port 124 and the outlet port 125 are in communication with the cold water inlet pipe 13, the hot water inlet pipe 14 and the outlet pipe 15 respectively. The bottom of the adapter disk 20 has two extension legs 21 corresponding to the positioning recesses 121 of the faucet 10. The interiors of the two extension legs 21 are formed with a cold water through-hole 22 and a hot water through-hole 23 respectively in communication with the top surface of the adapter disk 20. The top surface of the adapter disk 20 is provided with an outlet through-hole 24 and two locking holes 25 that are formed in diagonal relationship with respect to the extension legs 21 respectively. The peripheries of the adapter disk 20 and the extension legs 21 are each provided with a respective sealing ring 26. The periphery of the front surface of the adapter disk 20 is formed with an upwardly-extending flange 27.

Figure 5:
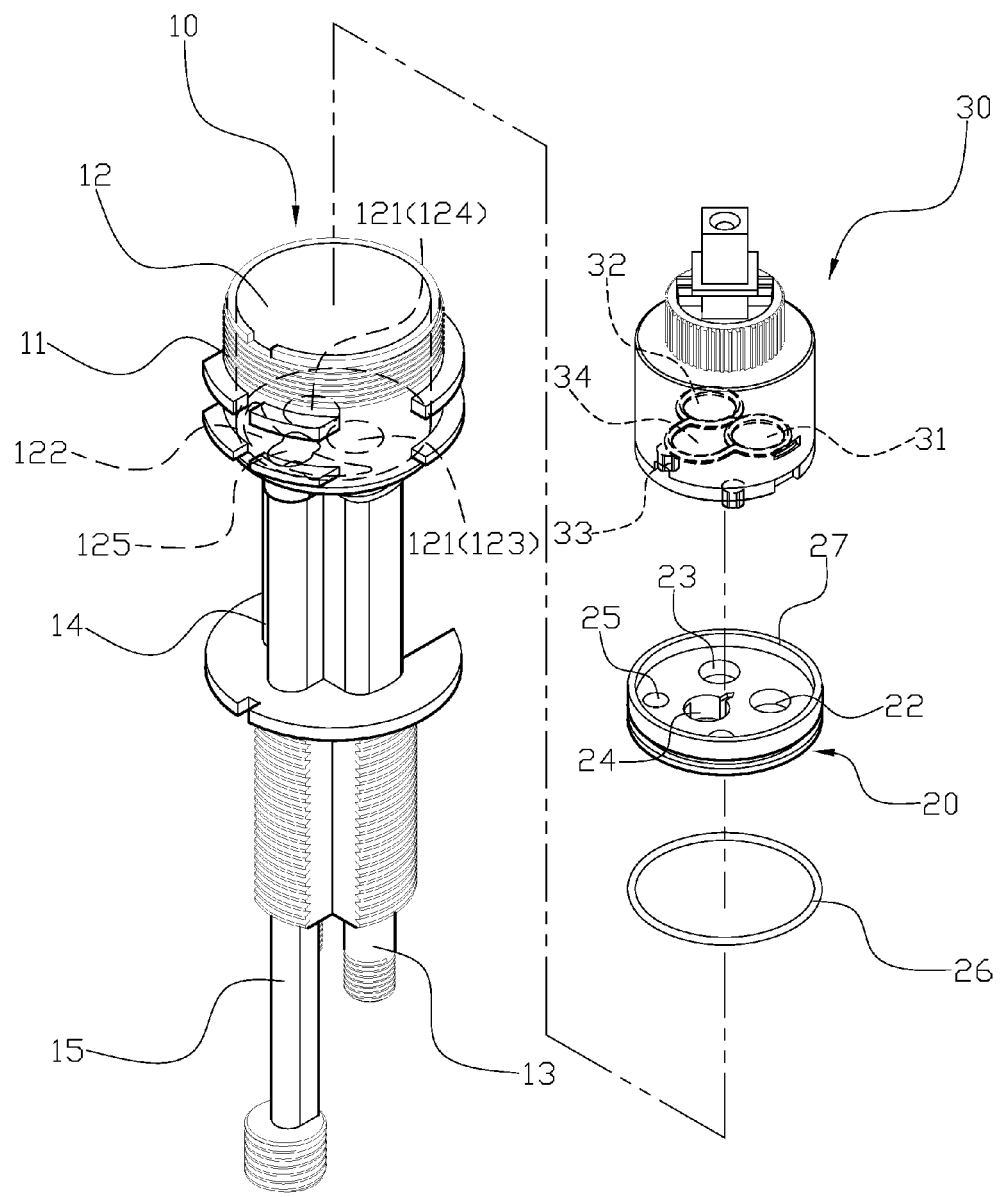
FIG. 5 is an exploded perspective view showing an embodiment faucet being used with a precise ceramic control valve.
Figure 6:
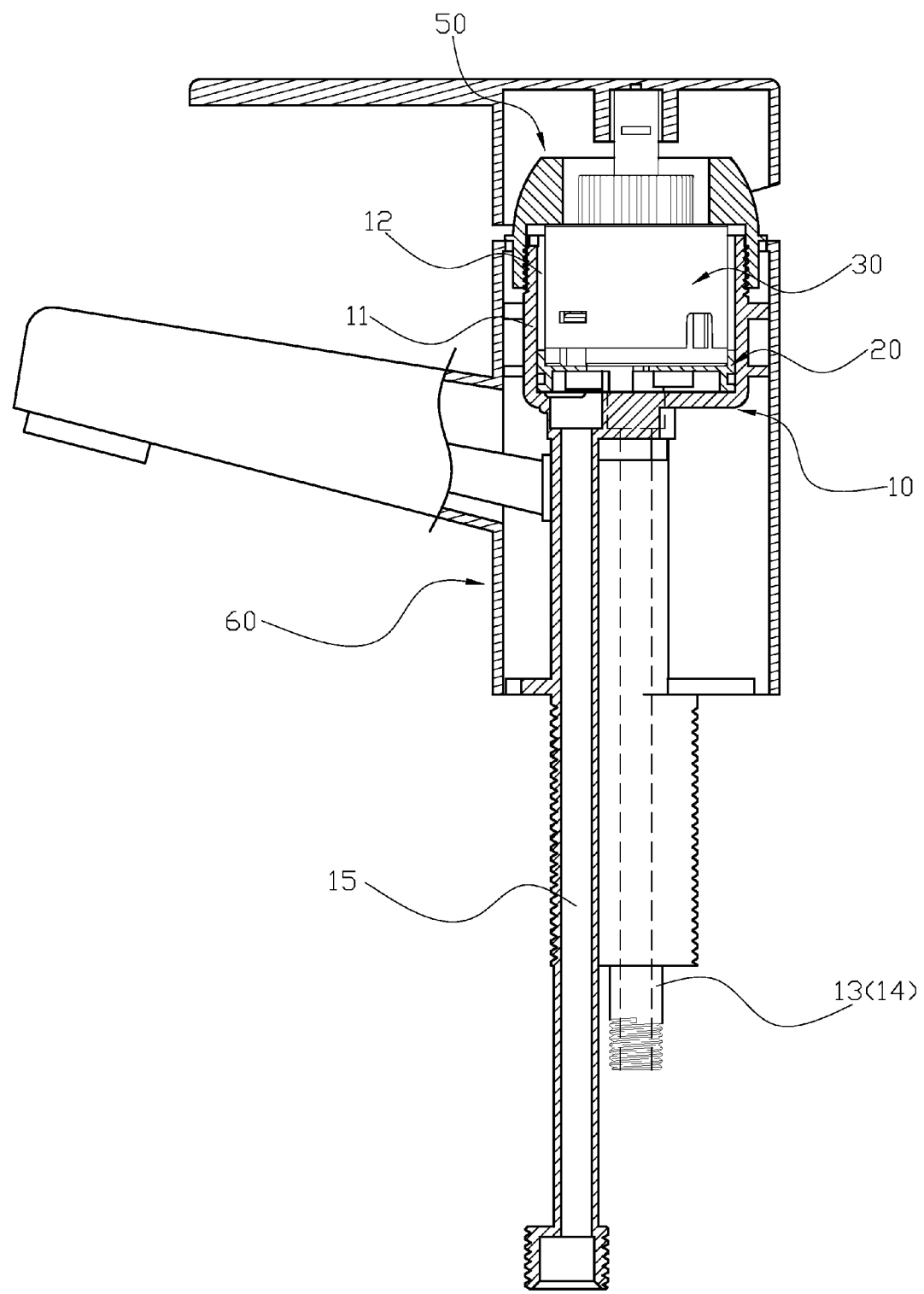
FIG. 6 is an assembled cross-sectional view showing an embodiment faucet being used with a precise ceramic control valve.
Figure 7:
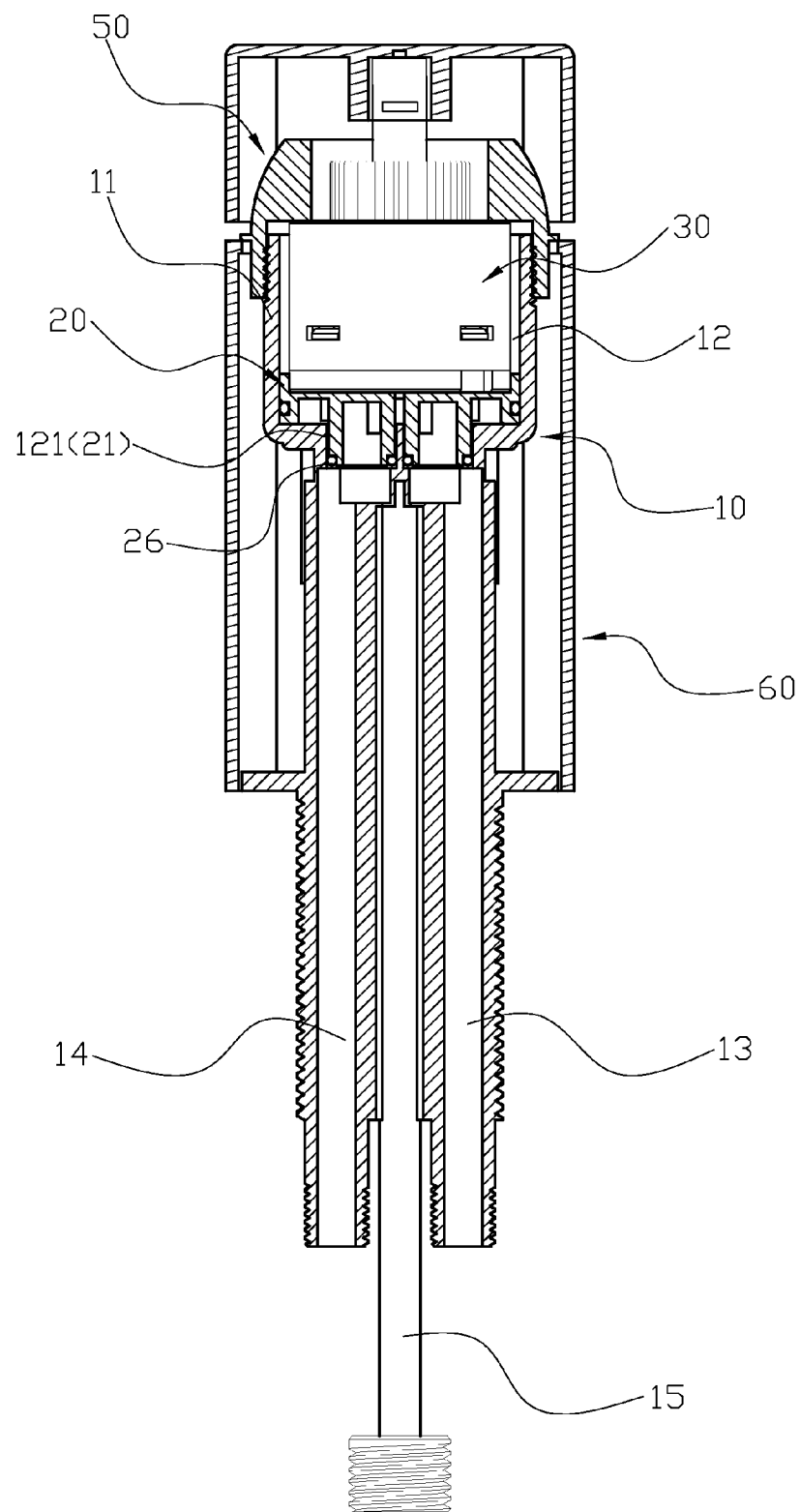
FIG. 7 is an assembled cross-sectional view showing an embodiment faucet being used with a precise ceramic control valve taken from another viewing angle.

Please refer to FIGS. 5, 6, and 7. The operation of the embodiment faucet 10 will be described. When the faucet 10 is used with a precise ceramic control valve 30, the adapter disk 20 is disposed in the valve chamber 12 of the faucet 10 with the extension legs 21 of the adapter disk 20 engaging with the positioning recesses 121 of the faucet 10. Then, the precise ceramic control valve 30 is disposed on the adapter disk 20 in such a manner that a cold water inlet 31 and a hot water inlet 32 of the precise ceramic control valve 30 are in communication with the cold water through-hole 22 and the hot water through-hole 23 of the adapter disk 20. By means of the adapter disk 20, the cold water inlet 31 and the hot water inlet 32 of the precise ceramic control valve 30 are set in communications with the cold water inlet port 123 and the hot water inlet port 124, respectively, so that the precise ceramic control valve 30 can be correctly utilized in the faucet 10. Further, when the precise ceramic control valve 30 is placed on the adapter disk 20, two locking posts 33 formed on the bottom surface of the precise ceramic control valve 30 are inserted into the locking holes 25, so that the precise ceramic control valve 30 can be positioned on the adapter disk 20 accurately. After a faucet shroud 50 and a faucet body 60 are assembled onto the faucet 10, the precise ceramic control valve 30 is held in a proper position and any undesirable upward movement of the control valve 30 is prevented. The user can operate a handle of the faucet body 60 together with a relative movement between upper and lower ceramic pieces of the precise ceramic control valve 30 to thereby control the opening/closing of the control valve 30 and the mixing ratio between the cold water and the hot water. After the hot water and the cold water are mixed within the precise ceramic control valve 30 into warm water, the warm water flows through an exit hole 34 of the precise ceramic control valve 30, an outlet through-hole 24 of the adapter disk 20, and the outlet port 125 of the faucet 10. Finally, the warm water is supplied externally via the outlet pipe 15 of the faucet 10.

Figure 8:
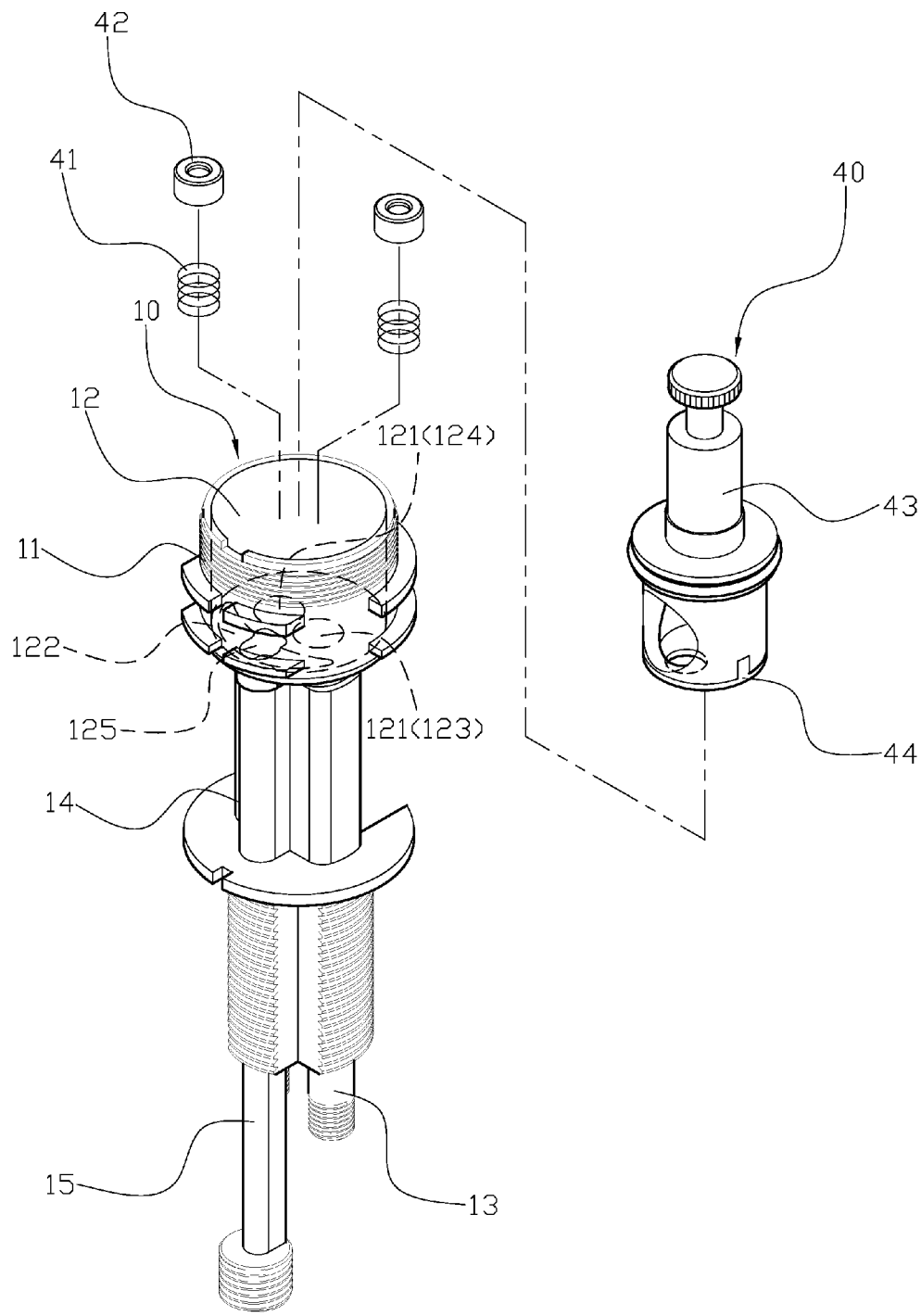
FIG. 8 is an exploded perspective view showing an embodiment faucet being used with a safety control valve.
Figure 9:
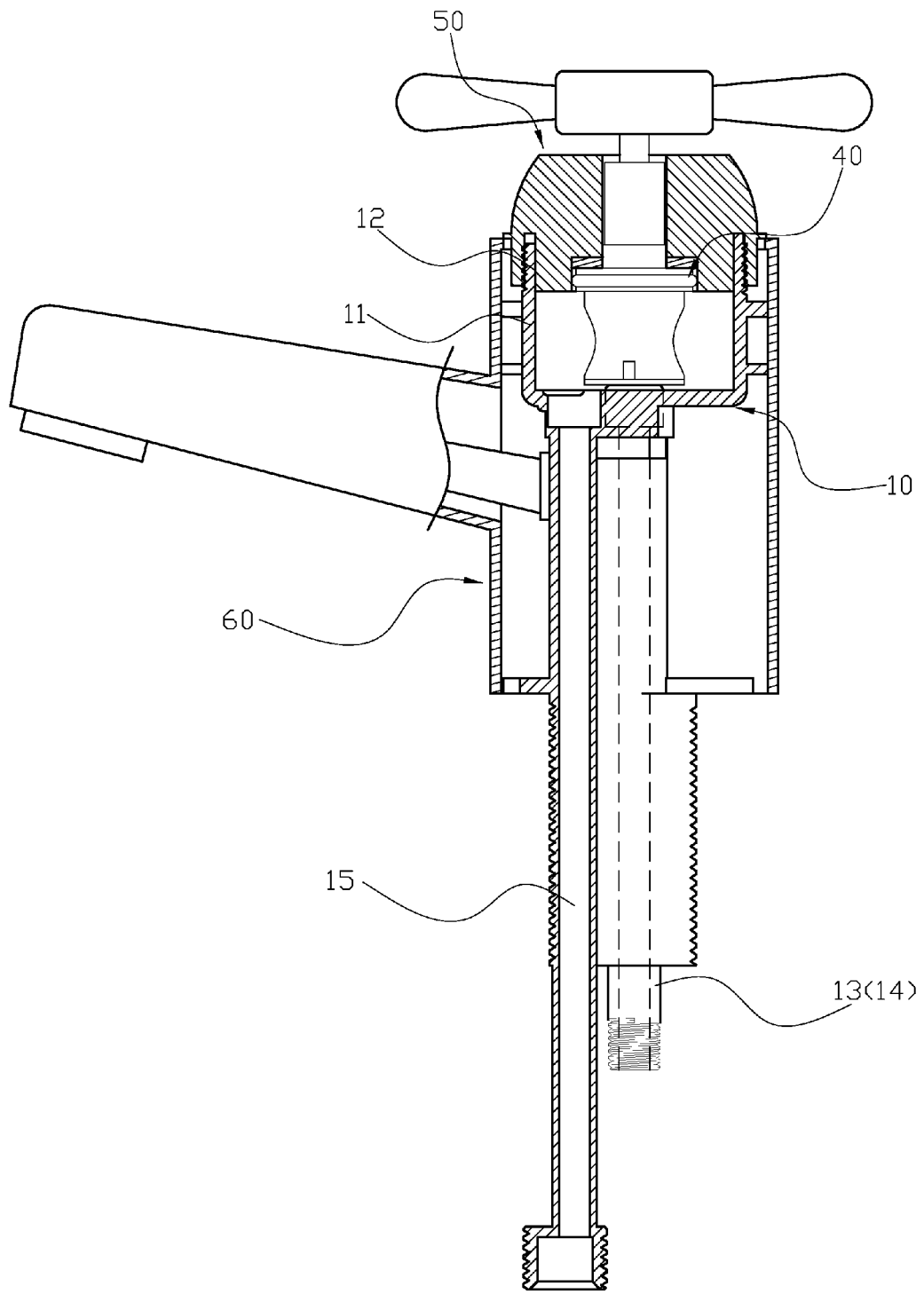
FIG. 9 is an assembled cross-sectional view showing an embodiment faucet being used with a safety control valve.
Figure 10:
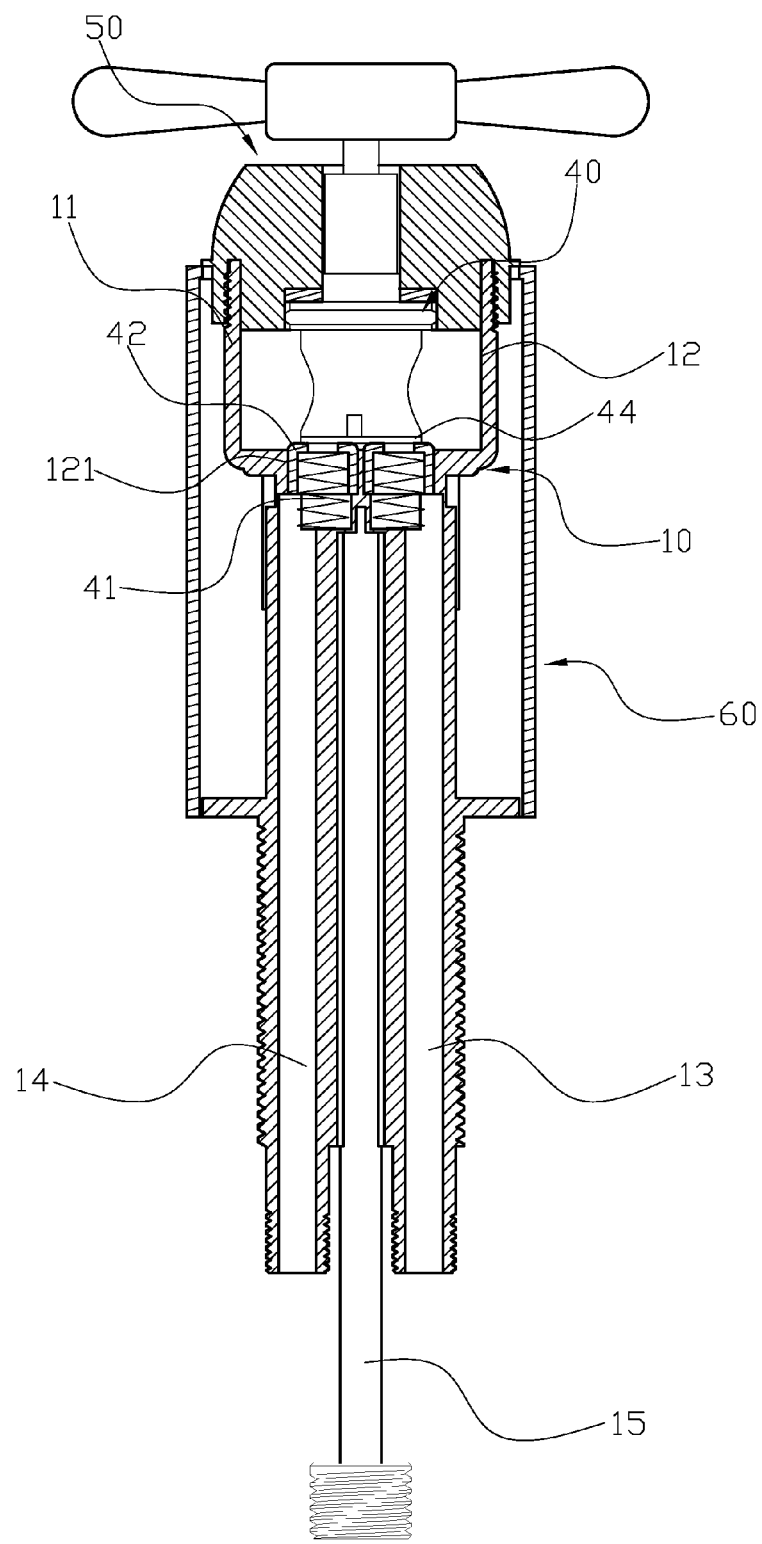
FIG. 10 is an assembled cross-sectional view showing an embodiment faucet being used with a safety control valve taken from another viewing angle.

Please refer to FIGS. 8, 9, and 10. When the faucet 10 is used with a safety control valve 40, a sealing sleeve 42 jacketed with a spring 41 is first placed into each of the two positioning recesses 121 of the faucet 10. A switch rod set 43 is then disposed into the valve chamber 12. After the faucet shroud 50 and the faucet body 60 are mounted together with the faucet 210, the switch rod set 43 and the sealing sleeve 42 jacket with the springs 41 are held in a proper position and any undesirable upward movement of these elements is prevented. The user can operate the handle of the faucet body 60 together with a switching action of a bottom valve 44 of the switch rod set 43 to thereby control the opening/closing of the control valve 40 and the mixing ratio between the cold water and the hot water flowing therein. After the hot water and the cold water are mixed in the safety control valve 40 into warm water, the warm water flows through the outlet port 125 of the faucet 10. Finally, the warm water is supplied to the outside via the outlet pipe 15 of the faucet 10.

In summary, an embodiment faucet having a replaceable control valve has the following advantageous features. When the faucet 10 is used alone, a safety control valve 40 can be mounted therein directly. By using an adapter disk 20, a precise ceramic control valve 30 can be mounted in the same faucet 10, so that only a single faucet 10 needs to be used for two different kinds of control valves. Therefore, since the faucet 10 can be selectively used with the precise ceramic control valve 30 and the safety control valve 40, the manufacturers in this field need not implement different kinds of faucets to meet these two control valves, thereby reducing the costs of developing and manufacturing the faucets. Also, the amount of storage space required for the faucets can be decreased. Thus, it is apparent that the embodiment faucet is more competitive in the market.

The above disclosed embodiment is merely a preferred embodiment of the present invention. Various equivalent variations and modifications may be designed as known to those skilled in the art in view of the teachings of the present invention. Thus, all such variations and equivalent modifications are also embraced within the scope of the invention as defined in the appended claims.

What is claimed is:

1. A faucet capable of replacing control valves, the faucet having a removable adapter disk, wherein the faucet has a base, a valve chamber formed in the base, the bottom of the base in communication with a cold water inlet pipe, a hot water inlet pipe and an outlet pipe, an inner bottom surface of the valve chamber having two spaced positioning recesses, one side of the two positioning recesses provided with a mixing trough, the two positioning recesses and the mixing trough in communications with a cold water inlet port, a hot water inlet port and an outlet port respectively, the cold water inlet port, the hot water inlet port and the outlet port in communications with the cold water inlet pipe, the hot water inlet pipe and the outlet pipe respectively;

a bottom of the adapter disk having two extension legs corresponding to the positioning recesses of the faucet, interiors of the two extensions legs forming a cold water through-hole and a hot water through-hole respectively in communications with a top surface of the adapter disk, the top surface of the adapter disk comprising an outlet through-hole;

wherein the adapter disk is configured so that a ceramic control valve can be mounted in the faucet by means of the adapter disk.

2. The faucet capable of replacing control valves according to claim 1, wherein two locking holes are formed on the same surface as the outlet through-hole diagonally with respect to the extension legs respectively, the two locking holes accepting two locking posts disposed on the bottom of the ceramic control valve when the adapter disk and the ceramic control valve are sequentially disposed in the valve chamber of the faucet.

3. The faucet capable of replacing control valves according to claim 1, wherein peripheries of the adapter disk and the extension legs are provided with a respective sealing ring.

4. The faucet capable of replacing control valves according to claim 1, wherein a periphery of the top surface of the adapter disk comprises an upwardly-extending flange.

5. The faucet capable of replacing control valves according to claim 1, wherein the faucet is configured to accept a safety control valve when the adapter disk is not present in the faucet.

* * * * *